Aug. 19, 1947.  H. F. SCHULTZ  2,425,838
TRAILER HITCH
Filed Dec. 26, 1944
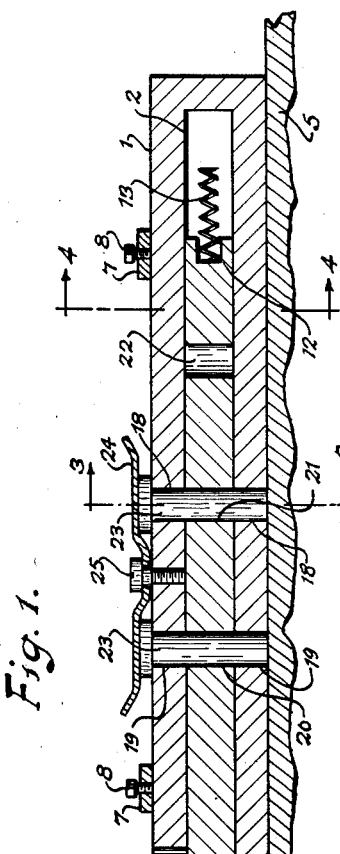
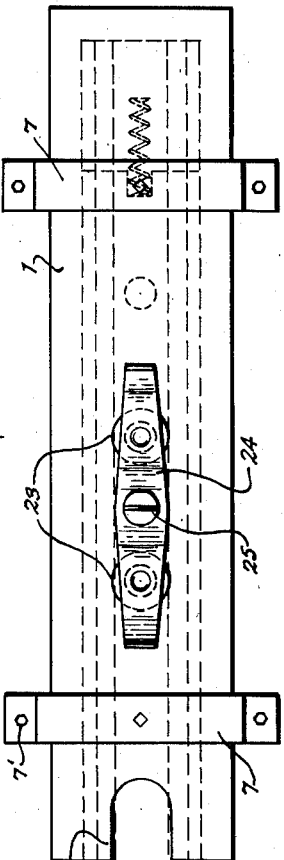
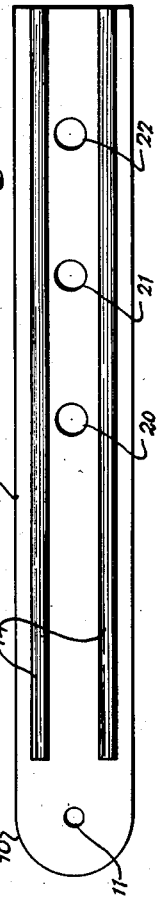
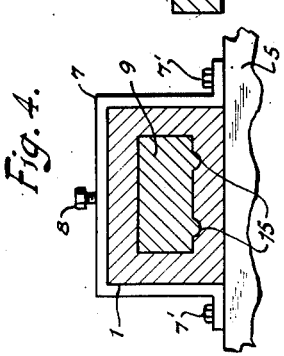
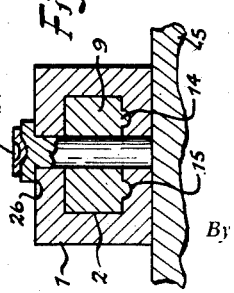
Inventor
Henry F. Schultz.
By Clarence A. O'Brien
and Harvey B. Jacobson
Attorneys Patented Aug. 19, 1947

2,425,838

UNITED STATES PATENT OFFICE 2,425,838

TRAILER HITCH

Henry F. Schultz, Flushing, Mich.

Application December 26, 1944, Serial No. 569,796

1 Claim. (Cl. 280—33.44)

My invention relates to improvements in trailer hitches for automobiles, particularly touring cars and the like.

The invention is designed with the principal object in view of providing a trailer hitch of simple form and inexpensive construction especially adapted for installation in the trunk compartment of automobiles to be extended out of the same for use, and which occupies a minimum amount of space in the trunk compartment, is hidden from view when not in use, readily accessible for quick easy coupling to a trailer and will not rattle or otherwise get out of order.

To the accomplishment of the above, and subordinate objects presently appearing, a preferred embodiment of my invention has been illustrated in the accompanying drawing, set forth in detail in the succeeding description, and defined in the claim appended hereto.

In said drawing:

Figure 1 is a fragmentary view in longitudinal section illustrating my improved trailer hitch installed in the trunk compartment of an automobile, and with the draw bar extended out of the trunk compartment for coupling to a trailer, Figure 2 is a view in plan of the trailer hitch detached, Figure 3 is a view in transverse section taken on the line 3—3 of Figure 1, Figure 4 is a similar view taken on the line 4—4 of Figure 1, Figure 5 is a view in bottom plan of the draw bar detached.

Reference being had to the drawing by numerals, my improved trailer hitch, as shown, comprises an elongated rectangular bar-like housing 1 provided with a rectangular guideway 2 therein open at what constitutes the rear end 3 of the housing and closed at its front end. The housing 1 may be of any suitable length to fit into the trunk compartment 4 of an automobile and is preferably formed of steel and of greater width than depth to render the same strong and provide for the housing projecting a minimum distance above the floor 5 of the trunk compartment 4. The housing 1 is adapted to be secured to the floor 5, or floor structure, of the trunk compartment 4 with its rear end just clearing the door 6 of the trunk compartment, and by means of a pair of rectangular U-shaped clamping brackets 7 straddling said housing adjacent the opposite ends thereof and bolted to the floor 5, as at 7'. Set screws 8 are provided in the brackets 7 for turning against the top of the housing 1 to further secure said housing in place and prevent the same and the brackets 7 from chattering or rattling under vibration of the automobile.

An elongated, rectangular draw bar 9 of substantially the same length as that of the housing 1 is slidably fitted in the guideway 2. The draw bar 9 is provided with a rounded rear end 10 apertured, as at 11, for coupling to a trailer, not shown, by the usual coupling pin or the like. The front end of the draw bar 9 is socketed, as at 12, to receive one end of a coil spring 13 interposed between said front end and the front end of the housing 2 and serving as a resilient bumper. Longitudinal ribs 14 are provided on the bottom of the draw bar 9, upon opposite sides of the longitudinal center of said bar to slide in complemental grooves 15 provided in the bottom of the guideway 2. The ribs 14 and grooves 15 are designed to obviate side play of the draw bar 9 in the guideway 2 in the event of wear between the sides of said bar and guideway. A suitable opening 16 is provided in the bottom of the door 6, or in the structure beneath said door, as the case may be, to permit the draw bar 9 to be extended out of the trunk compartment 4. A notch 17 is provided in the top of the housing 1 at the rear end 3 thereof to accommodate certain types of couplings, not shown, which may be permanently attached to the draw bar 9, and when said draw bar is fully retracted into the housing 1.

Means is provided for coupling the draw bar 9 to the housing 1 in different rearwardly extended positions and in fully retracted position comprising the following:

A pair of vertically aligned coupling pin-receiving openings 18 are provided in the longitudinal and transverse center of the housing 1, in the top and bottom of said housing, and another pair of similar openings 19 in the rear of the pair 18. A coupling pin-receiving opening is provided in the longitudinal center of the draw bar 9 and substantially in the transverse center of said bar, as shown at 20, and two similar openings 21, 22 in advance of the opening 20 also located in the longitudinal center of the draw bar. The openings 20, 21, 22, are spaced apart longitudinally of the draw bar 9 the same distance as the pairs of openings 18, 19. A pair of headed coupling pins 23 are provided for insertion in said openings. A keeper bar 24, of resilient metal, is pivoted midway of its ends on top of the housing 1 by a bolt 25 extending into the top of the housing 1 midway between the openings 18, 19, the arrangement being such that the keeper bar 24 may be swung on said bolt 25 over the heads of the coupling pins 23 to latch said pins down against vertical play. As shown in Figure 3, the coupling pins 23 are provided with head sockets, as at 26, and the keeper bar 24 with bosses, as at 27, designed to snap into the sockets 26 to latch said keeper bar to said coupling pins.

As will be understood, the described trailer hitch is designed to be attached in the longitudinal center of the trunk compartment 4 and the housing 1 may be of any desired length, within the limits prescribed by the length of the trunk compartment.

Referring now to the use and operation of the described hitch, the draw bar 9 may be extended out of the trunk compartment 4 into a partially extended position, as shown in Figure 1, for coupling to a trailer, not shown, and by inserting the coupling pins 23 through the pairs of openings 18, 19 in the housing 1 and the rearmost and intermediate openings 20, 21 in said draw bar. On the other hand, if it is desired to couple to a trailer with the draw bar 9 in further extended position, said bar may be pulled rearwardly to align the intermediate and foremost openings 21, 22 with the pairs of openings 19, 18 and the coupling pins 23 inserted through the appropriate aligned openings. It will be noted that in either of the described extended positions of the draw bar 9, two coupling pins 23 are used, thereby providing for securely coupling the draw bar 9 to the housing 1 so as to pull a heavy load. When the draw bar 9 is not in use, it may be retracted into the guideway 2 until its rear end 10 is hidden in the trunk compartment 4 and substantially fills the opening 16 and said draw bar may be coupled to the housing 1 in its retracted position by using a single one of the coupling pins 23 inserted through the pair of openings 18 in the housing 1, and the rearmost opening 20 in said draw bar. The spring 13, in any position of the draw bar 9, urges the latter rearwardly against the coupling pins 23 and prevents the draw bar from chattering, also the pins, when the draw bar is relieved of load thereon.

It will be understood that in the retracted position of the draw bar 9, the rear end 10 thereof clears the opening 16 sufficiently to permit the door 6 to be opened without interference with said draw bar.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A trailer hitch for use in the trunk compartment of an automobile on the floor structure of said compartment comprising an elongated bar-like housing adapted to be mounted on said structure in the longitudinal center of the compartment and having a longitudinal guideway therein provided with an open rear end, a draw bar slidably fitted in said guideway and adapted to be extended out of said rear end and compartment, and means to couple said draw bar to said housing in different extended positions comprising a pair of coupling pins, said housing having a longitudinally spaced pair of vertically aligned openings therein, one pair for each coupling pin, said draw bar having openings therein longitudinally spaced in correspondence with the spacing of said pairs and exceeding in number by one of the pairs of openings whereby two openings in the draw bar may be registered with said pairs of openings in two extended positions of said draw bar only to receive both coupling pins in the two extended positions of said draw bar solely.

HENRY F. SCHULTZ.

REFERENCES CITED

The following references are of record in the file of this patent:

UNITED STATES PATENTS

| Number | Name | Date |
| --- | --- | --- |
| 1,068,334 | Goodhue | July 22, 1913 |
| 2,162,481 | Fry | June 13, 1939 |
| 2,212,081 | Spires | Aug. 20, 1940 |
| 2,179,439 | Trow | Nov. 7, 1939 |